(12) United States Patent
Josefsson

(10) Patent No.: US 7,421,404 B2
(45) Date of Patent: Sep. 2, 2008

(54) METHOD AND A SYSTEM WITH IMPROVED TRACKING OF TRADING POSITIONS

(75) Inventor: Magnus Josefsson, Täby (SE)

(73) Assignee: OMX Technology AB, Stockholm (SE)

( * ) Notice: Subject to any disclaimer, the term of this patent is extended or adjusted under 35 U.S.C. 154(b) by 1188 days.

(21) Appl. No.: 10/313,013

(22) Filed: Dec. 6, 2002

(65) Prior Publication Data

US 2004/0111354 A1 Jun. 10, 2004

(51) Int. Cl.
*G06Q 40/00* (2006.01)
(52) U.S. Cl. .............................. 705/35; 705/37; 705/26
(58) Field of Classification Search ................... 705/35, 705/37
See application file for complete search history.

(56) References Cited

U.S. PATENT DOCUMENTS

| | | | |
|---|---|---|---|
| 5,953,423 A | | 9/1999 | Rosen |
| 2001/0049649 A1* | | 12/2001 | Baecker et al. ................ 705/37 |
| 2004/0111356 A1 | | 6/2004 | Srivastava et al. |

OTHER PUBLICATIONS

Peluso, "T+1: Real-time Processing & Real-Time Results," Nov./Dec. 2000, ABA Trust & Investments, vol. 78, p. 34.*
International Search Report dated Jun. 23, 2004.
Singapore Search and Examination Report mailed Mar. 5, 2007 in corresponding Application 2005035852.
Australian Examination Report mailed Feb. 13, 2007 in corresponding Application SG 200503585-2.

* cited by examiner

*Primary Examiner*—Ella Colbert
*Assistant Examiner*—Samica L Norman
(74) *Attorney, Agent, or Firm*—Nixon & Vanderhye P.C.

(57) ABSTRACT

A clearing system holds positions that are affected by trades executed during trading cycles. The positions are updated by those trades in clearing cycles. A first trade is executed and includes first trade information regarding how the trade should affect a position, e.g., bought or sold, open or close, number of contracts, etc.). The first trade can be received by the clearing system at a time when a first clearing cycle for the first trade and a second clearing cycle for a subsequent second trade are both open. A trade which belongs to the first clearing cycle updates a first variable for a position for that first clearing cycle using the first trade information. Second trade information for the second trade belonging to the second clearing cycle which is also open updates the second variable for the position for that second clearing cycle.

13 Claims, 4 Drawing Sheets

|  | long | short |
|---|---|---|
| O/N | 0 | 0 |
| CTD relative | -10 | 0 |
| CTD absolute | 0 | 10 |
| NTD relative | -10 | 0 |
| NTD signed | -10 | 10 |
| NTD absolute | 0 | 20 |

Fig. 3

|  | long | short |
|---|---|---|
| O/N | 0 | 0 |
| CTD relative | -5 | 10 |
| CTD absolute | 0 | 15 |
| NTD relative | 0 | -20 |
| NTD signed | 0 | -5 |
| NTD absolute | 5 | 0 |

Fig. 4

| Variable | Calculated as |
|---|---|
| O/N (CC3) | CTD absolute (CC2) |
| CTD relative (CC3) | NTD relative (CC2) |
| CTD absolute (CC3) | NTD absolute (CC2) |
| NTD relative (CC3) | Trades for CC4 |
| NTD signed (CC3) | NTD relative (CC3) + CTD relative (CC3) |
| NTD absolute (CC3) | -> NTD signed (CC3) |

Fig. 5

METHOD AND A SYSTEM WITH IMPROVED TRACKING OF TRADING POSITIONS

TECHNICAL FIELD

One task in a financial clearing system is to keep positions for different accounts, a position being defined as the balance of bought and sold contracts of a particular variety in the account. In a clearing system, trades are received with certain information (e.g., bought or sold, open or close, number of contracts, etc.) that affects the positions and are executed during trading cycles. The positions in the system are updated according to clearing cycles. The technology described below facilitates keeping track of one or several positions which will be updated by a certain trade, regardless of when in a trading cycle that trade is executed or reported to the clearing system.

BACKGROUND

As stated above, one of the main tasks of a financial clearing system is to keep track of positions for one or several accounts in the system. Usually, positions are "locked" or frozen at the end of a so called clearing cycle, with the trades that affected that particular clearing cycle having been executed during a corresponding so called trading cycle. Until recently, a clearing cycle and its corresponding trading cycle would also essentially coincide in time, i.e. each clearing cycle would include trades having been executed before the closing time of the trading cycle, for example 5 P.M., with the clearing cycle possibly being open until a slightly later point in time, for example 5:30 PM, in order to enable trades that had been executed during the trading cycle to be processed by the clearing system. In this way, it could always be seen which clearing cycle that a trade belonged to, and how the trade should thus update the positions in the system.

However, recently there has been a demand for the possibility of executing trades during extended opening hours, possibly on a 24 hour basis. Since a clearing cycle, inter alia for practical reasons, should be open longer than the corresponding trading cycle, this can lead to two clearing cycles being open at the same time, i.e. there might be an overlap in time for two different clearing cycles. This, in turn, might lead to difficulties or uncertainties when trying to get an overview of the total situation in an account, or in the system as a whole.

The demands for longer trading cycles thus impose new demands on clearing systems, such as, for example, the following:

Separation between trades which are executed during a current first trading clearing cycle but which are reported to the system during a later second trading cycle.

The ability to show the proper balance for a position, where the balance reflects the actual situation with all transactions taken into account, and thus, shows all trades regardless of when they were executed.

In addition, it is desirable for trades to include information as to how the trade affects the position, e.g., bought or sold, "open" or "close," number of contracts, etc.

SUMMARY

The new demands posed on clearing systems, as described above, are addressed by a method for use in a clearing system, in which system positions are held which are affected by trades, said trades being executed during trading cycles in time, and in which system the positions are updated by said trades according to clearing cycles in time. A first executed trade includes first trade information as to how the trade should affect the position.

The first trade can be received by the clearing system at a point in time when both the first clearing cycle for the first trade and second clearing cycle for a second trade are open. The first trade information which belongs to the first open clearing cycle updates a first variable for a position for that clearing cycle. The second trade information which belongs to the second open clearing cycle updates a second variable for the position for that clearing cycle. As a result, the first variable can be used as a measurement of the position to be held overnight (O/N).

BRIEF DESCRIPTION OF THE DRAWINGS

FIGS. 3 and 4 are tables illustrating steps which are comprised in calculations in an example embodiment, and FIG. 5 is a table illustrating a transition between two cycles in a system which uses the technology described.

DETAILED DESCRIPTION

Figure 1:
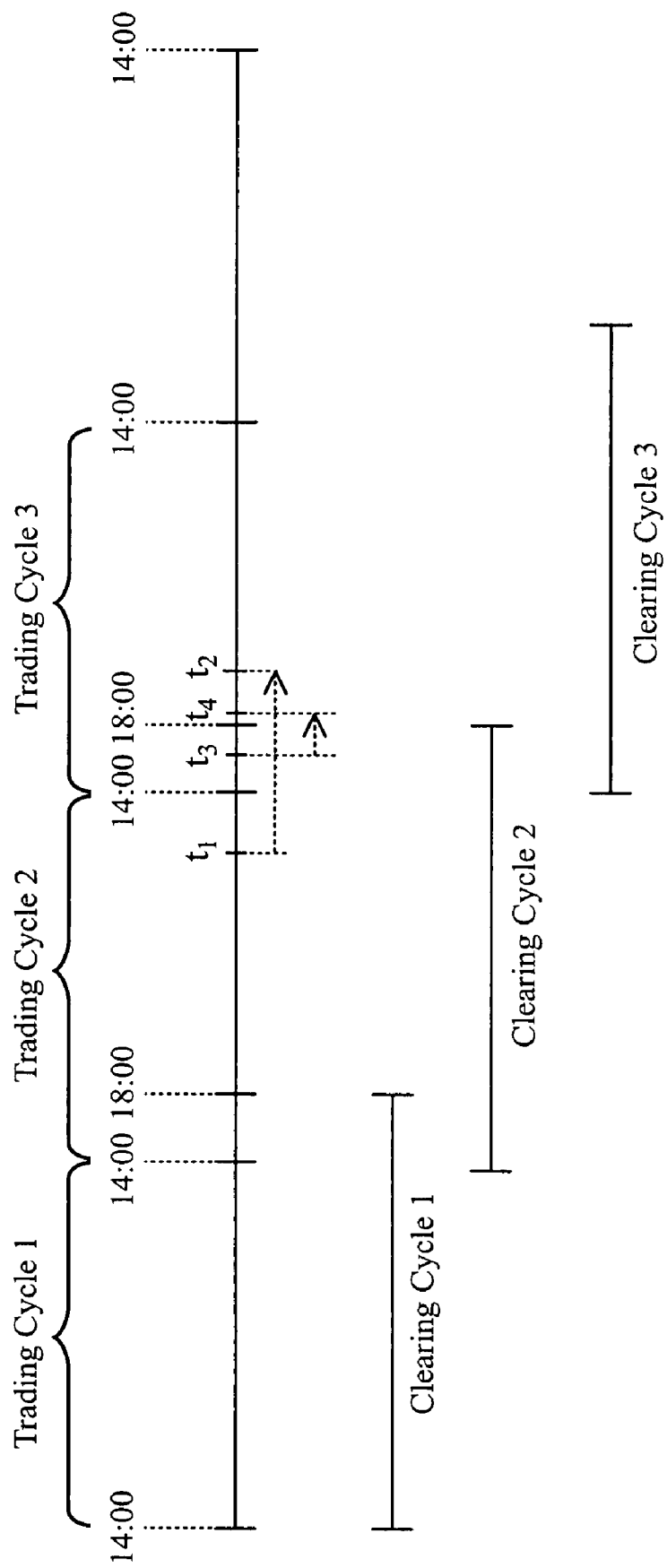
FIG. 1 is a timeline of events in a clearing system.

A timeline of events in a clearing system is shown in FIG. 1. A first trading cycle extends between two points in time, by way of example shown as 14:00 on consecutive days. A second trading cycle starts when the first trading cycle ends, i.e., at 14:00 the next day, a pattern which is then repeated for third, fourth, etc. trading cycles. Naturally, there can also be short pauses in time during a trading cycle or between two consecutive trading cycles.

For each trading cycle, there is a corresponding clearing cycle during which trades that are executed during a certain trading cycle should be received and cleared by the system. In order for trades which are executed late in a trading cycle to be cleared, the clearing cycle is usually open until a point in time which extends beyond the closing point of the trading cycle. In the FIG. 1 example, the clearing cycle closes at 18:00 for a trading cycle which closes at 14:00.

As illustrated in FIG. 1, problems can arise with trades that are executed or reported close to the end of one trading cycle or the beginning of the next trading cycle: a first clearing cycle for a first trading cycle closes at 18:00, with a second clearing cycle for a second trading cycle opening at 14:00, i.e. before the first clearing cycle has closed. There is thus an overlap in time (14:00-18:00) between successive clearing cycles.

That overlap can cause problems as illustrated in the following example shown in FIG. 1. A first trade is executed at a point in time $t_1$ during the second trading cycle, but is reported to the system at a point in time $t_2$ which occurs after the second trading cycle has closed and the third trading cycle has opened, during the overlap of the second and third trading cycles. There are thus two possible clearing cycles which can receive this trade.

A second trade is also shown in FIG. 1 executed at a point in time $t_3$ and reported at $t_4$, both of which times occur before $t_2$. Since the second trade is executed during the third trading cycle, it should be cleared during the clearing cycle which corresponds to that trading cycle, i.e. the third clearing cycle. Again, there are two possible clearing cycles which can receive this trade, the proper one being the third clearing cycle, although the trade was reported earlier than the first trade.

Figure 2:
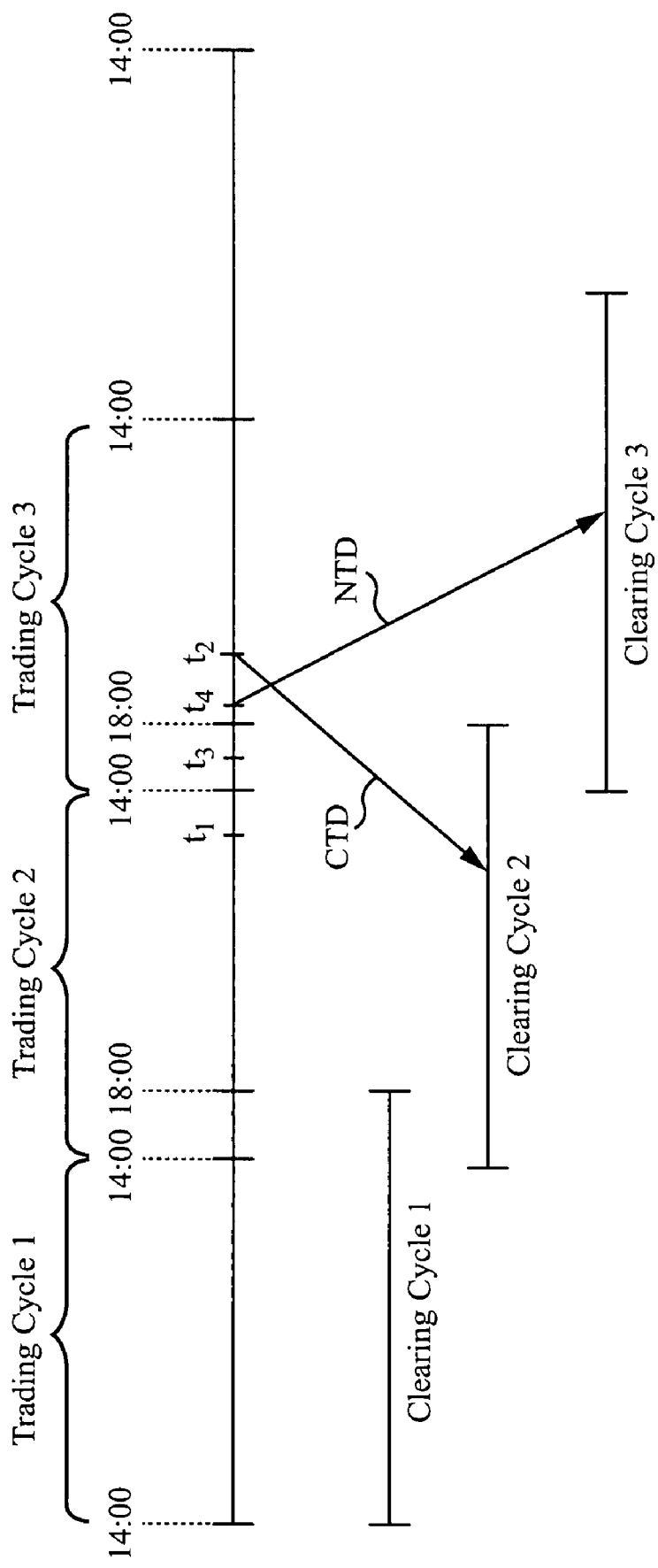
FIG. 2 shows the timeline of FIG. 1 using the technology described.

With the aid of FIG. 2, a sequence of events will now be illustrated. For the sake of clarity, it is assumed that the position at the start of the sequence of events is 0/0, i.e., comprising two integers, one on each side of a slash sign, where the integer to the left of the slash is known as the "long" part of the position, and the integer on the right is the "short" part of the position, with "long" and "short" corresponding to the amounts bought and sold respectively in that account. Thus, at the start of the following example, the position is "empty".

Trades received can be either for "buy" or "sell", with the trade comprising additional information on how the trade should affect the position: "buy" or "sell" can be combined with either the information "open" or "close". Thus there will be four combinations, with the following meanings:

Buy open—increase the amount bought
Buy close—decrease the amount sold
Sell open—increase the amount sold
Sell close—decrease the amount bought In FIG. 2, at a point in time $t_1$ during the second trading cycle, a first trade is executed. The trade by way of example is "sell 10 close", i.e., sell 10, and let the trade decrease the amount bought, i.e., the amount on the left side of the slash sign. Although this first trade is executed during the second trading cycle, $TC_2$, it is reported to the clearing system at a point in time $t_2$ during the next trading cycle, $TC_3$. There could thus be a possible source of confusion here, since the clearing cycles for both the second and the third trading cycles are open at $t_2$.

In order to address this problem, first trade information updates a first variable for the trading cycle during which it was executed. The first variable is referred to as CTD (Current Trading Day). CTD represents a position, and comprises two values, the "long" and "short" values, shown as two integers on either side of a slash sign, i.e., long/short, where "long" shows the amount bought, and "short" shows the amount sold. The values in the variable CTD can be either negative or positive, and since the starting position of the example was "0/0", the new position (CTD) will be −10/0. Traditionally, the position could not have assumed a negative value, but would instead have been seen as 0/10.

Assuming, for the sake of clarity, that no other trades are executed for that particular account during the second trading cycle, $TC_2$, the corresponding clearing cycle, CC2, will close at −10/0, (i.e. CTD=−10/0) which values for the position will be carried over as starting values for the next clearing cycle. The values which are "carried over" to the next day in this manner is also referred to as the overnight position, abbreviated as O/N. Trades which are executed after the second trading cycle has closed, in the example after 14:00 on the second day, will thus belong to the third trading cycle, $TC_3$, and should be cleared in Clearing Cycle 3, $CC_3$.

Assume, again by way of example, that a second trade is executed at a point in time $t_3$ during TC3, and is reported to the clearing system at $t_4$. Both $t_3$ and $t_4$ occur before $t_2$, but this second trade should still be cleared within the third clearing cycle, $CC_3$. The second trade information—and possibly other such trades—will be used to update another variable, referred to as NTD (Next Trading Day). As with the CTD variable, NTD may comprise both a long and a short value, and will thus have the same format as CTD, i.e. "long"/"short". Both the long and short value of NTD can also be either positive or negative.

In addition, assume that this new trade is also for "sell 10 close". The values of the variable NTD will thus also be −10/0, whereas traditionally this trade would have been used together with the position of that account in the traditional form of the position, 0/10, to form a total position of 0/20.

Accordingly, the CTD and NTD variables solve the problems described in the background by enabling separation between trades which are received during a current clearing cycle but which can only be carried out during a second future clearing cycle, and trades received during the second trading cycle which can be carried out during the first clearing cycle. Thus, a user of a clearing system that employs these CTD and NTD variables, wishing to see the current status of the account for the current clearing cycle as well as the next clearing cycle will be shown the CTD and the NTD variables.

Because users are traditionally not familiar with the notion of negative numbers being used in positions, the CTD and the NTD may be translated into corresponding positive variables. For example, 0/10 is the positive corresponding position to the value of −10/0. Negative values may also only be used in internal calculations in the systems, and may be converted to a corresponding positive value before being displayed to users.

Another problem solved is that of showing the proper balance for a position, where the balance reflects the actual situation with all transactions taken into account. The CTD/NTD variable is also taken into account. With reference to the table in FIG. 3, the "starting values" for the positions are 0/0 corresponding to the position "inherited" from the previous cycle. These starting values are referred to as the overnight (O/N) position. How the O/N position is calculated is explained in more detail below.

In FIG. 3, the CTD and NTD positions from above of −10/0 are used, here referred to as "relative positions", since they will be used as starting positions in calculating a current position. Initially, the CTD relative position is translated into the more traditional corresponding position of 0/10, said position referred to in the table as "CTD absolute" A position referred to as "NTD signed" is also calculated, as a total of the CTD positive and the NTD relative, which in this case results in a "NTD signed" value of −10/10. This is translated into an "NTD absolute" position of 0/20, which is then displayed to the user.

In order to facilitate the understanding, another example similar to that of FIG. 3 is given in FIG. 4. In this example, the CTD relative position is −5/10, and the NTD relative is 0/−20. A "CTD absolute" position is calculated as 0/15, and the "NTD signed" position then becomes 0/−5, with the "NTD absolute" position being 5/0.

Negative integers in the positions are used so that the system will always let a "close" trade decrease the appropriate value in the position, even if this will result in a negative value. Negative integers also lead to a time-invariant calculation of the "absolute" positions, which, for example, are shown in FIGS. 3 and 4. This means that regardless of the order in which trades are reported to the clearing system, the resulting absolute positions will be the same. This can be a major advantage in an application in which trades are not reported to the system in the order in which they are executed, for example, a traditional so called "floor trade" system.

Since the variables CTD and NTD refer to "Current" and "Next" day, there must naturally be a "shift" at some point in time, i.e., at some point in time "Next Day" becomes "Current Day", and a new day is used as "Next Day", with the variables being updated accordingly. This will be illustrated with reference to FIG. 5. The table in FIG. 5 shows how the variables from the preceding text and from FIGS. 3 and 4 are calculated for the coming Clearing Cycles, with the example in FIG. 5 showing this process for the next Cycle, i.e., Clearing Cycle 4 (CC4).

The shift into variables for Clearing Cycle 4 will take place at a point in time after Trading Cycle 2 has closed, but preferably before Trading Cycle 4 and its corresponding Clearing Cycle 4 has opened. The shift is carried out in the following way as illustrated in FIG. 5:

the CTD absolute position from CC2 becomes the O/N (overnight) position for CC3, i.e. the starting position that CC3 "inherits" from CC2, the NTD relative position for CC2 is used as the CTD relative position for CC3.

the NTD absolute position of CC2 is used as the CTD absolute position for CC3.

The NTD relative position for CC3 is the sum of trades that have been executed for clearing in CC4.

The NTD signed position for CC3 is the sum of NTD relative (CC3) and CTD absolute (CC3) positions.

The NTD absolute position for CC3 is the NTD signed for the same clearing cycle, converted into a positive value as explained above in connection with FIGS. 3 and 4.

Although described using events within two consecutive cycles ($TC_2$, $CC_2$, and $TC_3$, $CC_3$), it is entirely possible to apply the technology to events over an arbitrary number of cycles. The points in time involved may of course also be varied. Looking at the explanation of how a transition between cycles takes place as illustrated in FIG. 5, it will become apparent that these calculations can take place without calculating the "NTD signed" position, since this position is merely a sum of two other positions which are as such known. Thus, the "NTD signed" position can be seen as an auxiliary value used for facilitating the calculations.

The invention claimed is:

1. A method for use in a clearing system, in which system positions are held which are affected by trades, said trades being executed during trading cycles in time, and in which system the positions are updated by said trades according to clearing cycles in time, wherein a first executed trade includes first trade information as to how the trade should affect the position, the method comprising the following steps implemented by the clearing system:
   receiving the first trade at a point in time when both the clearing cycle for the first trade and another clearing cycle for one or more subsequent trades are open;
   using the first trade information for the first trade which belongs to a first clearing cycle to update a first variable for a position for that clearing cycle;
   using second trade information for a second trade which belongs to a second clearing cycle which is also open to update a second variable for the position for that clearing cycle; and
   providing to one or more users one or more balances for the position for one or more clearing cycles based on the first variable.

2. The method of claim 1, additionally comprising the step of using the first variable from the first clearing cycle as a measurement of the starting value for the position in the second clearing cycle.

3. The method of claim 2, additionally comprising the step of using at least one further variable from the first clearing cycle as a starting value for a corresponding variable for the second clearing cycle when calculating the value of said further variable for said second clearing cycle.

4. The method of claim 3, wherein at least one of said first variable for said first clearing cycle and said second variable for said second clearing cycle comprises an integer smaller than zero.

5. The method of claim 4, additionally comprising the step of converting any variables that comprise integers smaller than zero into corresponding variables comprising only integers larger than or equal to zero prior to displaying said variables to a user of the system.

6. The method of claim 1, wherein the providing step includes providing to one or more users one or more balances for the position for one or more clearing cycles based on the first variable and on the second variable.

7. A computer program product comprising a computer-readable medium having a computer program embodied therein, the computer program product being useable in a clearing system in which system positions are held which are affected by trades, said trades being executed during trading cycles in time, and in which system the positions are updated by said trades according to clearing cycles in time, wherein a first executed trade includes first trade information as to how the trade should affect the position, wherein when the computer program is executed on a computer included as part of the clearing system, the computer program causes the computer to perform the following steps:
   receive the first trade at a point in time when both the clearing cycle for the first trade and another clearing cycle for one or more subsequent trades are open;
   use the first trade information for the first trade which belongs to a first clearing cycle to update a first variable for a position for that clearing cycle;
   use second trade information for a second trade which belongs to a second clearing cycle which is also open to update a second variable for the position for that clearing cycle; and
   provide to one or more users one or more balances for the position for one or more clearing cycles based on the first variable.

8. A clearing system in which system positions are held which are affected by trades, said trades being executed during trading cycles in time, and in which system the positions are updated by said trades according to clearing cycles in time, wherein a first executed trade includes first trade information as to how the trade should affect the position, the clearing system comprising:
   means for receiving the first trade at a point in time when both the clearing cycle for the first trade and another clearing cycle for subsequent trades are open; and
   means for using the first trade information for the first trade which belongs to a first clearing cycle to update a first variable for a position for that clearing cycle;
   means for using second trade information for a second trade which belongs to a second clearing cycle which is also open update a second variable for the position for that clearing cycle; and
   means for providing to one or more users one or more balances for the position for one or more clearing cycles based on the first variable.

9. The system of claim 8, further having means for using the first variable from the first clearing cycle as a measurement of the starting value for the position in the second clearing cycle.

10. The system of claim 8, further having means for using at least one further variable from the first clearing cycle as a starting value for a corresponding variable for the second clearing cycle when calculating the value of said further variable for said second clearing cycle.

11. The system of claim 10, wherein at least one of said first variable for said first clearing cycle and said second variable for said second clearing cycle comprises an integer smaller than zero.

12. The system of claim 11, further having means to convert any variables that comprise integers smaller than zero into corresponding variables comprising only integers larger than or equal to zero prior to displaying said variables to a user of the system.

13. The system of claim 8, wherein the means for providing is configured to provide to one or more users one or more balances for the position for one or more clearing cycles based on the first variable and on the second variable.

* * * * *